United States Patent
Efrati (10) Patent No.: US 9,728,202 B2
(45) Date of Patent: Aug. 8, 2017

(54) METHOD AND APPARATUS FOR VOICE MODIFICATION DURING A CALL

(71) Applicant: VONAGE AMERICA INC., Holmdel, NJ (US)

(72) Inventor: Tzahi Efrati, Hoboken, NJ (US)

(73) Assignee: Vonage America Inc., Holmdel, NJ (US)

( * ) Notice: Subject to any disclaimer, the term of this patent is extended or adjusted under 35 U.S.C. 154(b) by 0 days.

(21) Appl. No.: 15/083,276

(22) Filed: Mar. 28, 2016

(65) Prior Publication Data

US 2016/0210959 A1    Jul. 21, 2016

Related U.S. Application Data (63) Continuation-in-part of application No. 13/961,488, filed on Aug. 7, 2013, now Pat. No. 9,299,358.

(51) Int. Cl.

| | | |
|---|---|---|
| *G10L 21/00* | (2013.01) | |
| *G10L 21/003* | (2013.01) | |
| *G10L 15/00* | (2013.01) | |
| *G10L 21/013* | (2013.01) | |

(52) U.S. Cl.
CPC .......... *G10L 21/003* (2013.01); *G10L 15/005* (2013.01); *G10L 2021/0135* (2013.01)

(58) Field of Classification Search
USPC ................................................ 704/231, 271
See application file for complete search history.

(56) References Cited

U.S. PATENT DOCUMENTS

| | | | |
|---|---|---|---|
| 6,240,170 B1 * | 5/2001 | Shaffer | H04M 3/487 379/142.15 |
| 7,676,372 B1 | 3/2010 | Oba | |
| 7,966,188 B2 | 6/2011 | Ativanichayaphong et al. | |
| 8,380,504 B1 | 2/2013 | Peden et al. | |
| 8,451,823 B2 | 5/2013 | Ben-David et al. | |
| 8,566,088 B2 | 10/2013 | Pinson et al. | |
| 2003/0164899 A1 * | 9/2003 | Lee | H04N 5/60 348/484 |
| 2009/0006076 A1 * | 1/2009 | Jindal | G06F 17/289 704/3 |
| 2009/0274299 A1 | 11/2009 | Caskey et al. | |
| 2010/0161337 A1 | 6/2010 | Pulz et al. | |

(Continued)

OTHER PUBLICATIONS

Nancy Fang-Yin Chen; "Characterizing Phonetic Transformations and Fine-Grained Acoustic Differences Across Dialects"; Harvard-Massachusetts Institute of Technology, Jun. 2011, 175 pages.

(Continued)

*Primary Examiner* — Jesse Pullias
(74) *Attorney, Agent, or Firm* — Moser Taboada; Joseph Pagnotta (57) ABSTRACT

A method for voice modification during a telephone call comprising receiving a source audio signal associated with at least one participant, wherein the source audio signal comprises a voice of the at least one participant, detecting a source dialect of the at least one participant, selecting a target dialect based on at least a characteristic of a target participant and creating a modulated audio signal based on the source audio signal, the source dialect, and the target dialect and transmitting the modulated audio signal to the target participant.

13 Claims, 6 Drawing Sheets

(56) References Cited

U.S. PATENT DOCUMENTS

2013/0080172 A1 3/2013 Talwar et al.
2013/0226576 A1 8/2013 Jaiswal et al.

OTHER PUBLICATIONS

Janna B. Oetting, et al.; "Methods for Characterizing Participants' Nonmainstream Dialect Use in Child Language Research"; Louisiana State University Baton Rouge; J Speech Lang Hear Res. Jun. 2002, 45(3); 505-518, 22 pages.

* cited by examiner

FIG. 6

METHOD AND APPARATUS FOR VOICE MODIFICATION DURING A CALL

CROSS-REFERENCE TO RELATED APPLICATION

This application is a continuation-in-part of U.S. Pat. No. 9,299,358 issued Mar. 29, 2016, which is hereby incorporated in its entirety.

BACKGROUND OF THE INVENTION

Field of the Invention

Embodiments of the present invention generally relate to telecommunications and, in particular, a method and apparatus for voice modification during a call.

Description of the Related Art

As personal and business relationships become more global, individuals from different regions come into contact much more frequently. In recent years, English has become a de facto standard for business communication in many regions. However, accents and dialects still reflect regional differences. This can make it difficult for two speakers from different regions to understand each other, particularly on a telephone call where there may be no visual cues to help interpret otherwise ambiguous sounds. In some instances, audio quality may further hinder telephone call participants from understanding different dialects and accepts. For example, when a person contacts a call center for technical support, they may have difficulty understanding the technician due to a difference in accents. Similarly, when non English-native speakers call interactive voice response (IVR) systems, the system might not recognize them or understand their words because of their accent.

What is needed is a system and method for voice modification during a call of one or more participants so that they may be better-understood by other call participants.

SUMMARY OF THE INVENTION

Embodiments of the present invention generally relate to a method and apparatus for voice modification during a telephone call comprising receiving a source audio signal associated with at least one participant, wherein the source audio signal comprises a voice of the at least one participant, detecting a source dialect of the at least one participant, selecting a target dialect based on at least a characteristic of a target participant and creating a modulated audio signal based on the source audio signal, the source dialect, and the target dialect and transmitting the modulated audio signal to the target participant Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate to voice modification during a call. According to at least one exemplary embodiment, two or more participants engage in a telephone call, or a telephone conference. The participants may be from different countries, regions, or the like, and may have varied accents and language conventions not common to everyone on the call. Each participant's dialect is detected and a speech profile is retrieved based on the dialect as well as other identifying metadata. A target dialect is chosen and one or more of the participants voices are modulated to resemble the target dialect.

The following detailed description of preferred embodiments refers to the accompanying drawings, which illustrate specific embodiments of the invention. Other embodiments having different structures and operations do not depart from the scope of the present invention.

In the following description, the terms VOIP system, VOIP telephony system, IP system and IP telephony system are all intended to refer to a system that connects callers and that delivers data, text and video communications using Internet protocol data communications.

Figure 1:
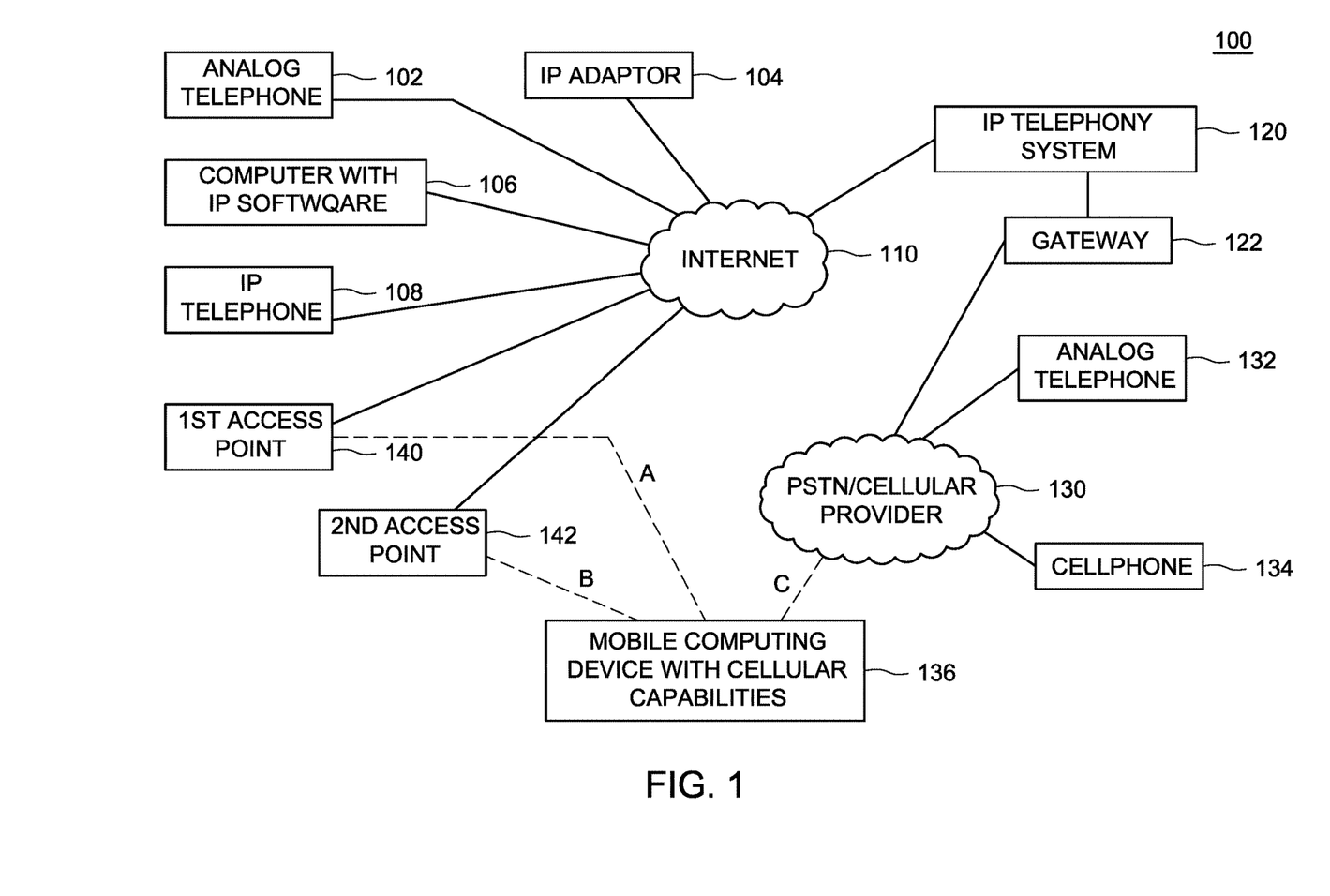
FIG. 1 is a diagram of a communications environment including various elements which are associated with an Internet protocol (IP) telephony system operating in accordance with the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a publicly switched telephone network (PSTN) 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize the data channel of a cellular telephone system to access the Internet 110.

Alternatively, a customer could utilize a analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone and an IP telephone.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the Apple iPhone™, that includes both cellular telephone capabilities and a wireless data transceiver that can establish a wireless data connection to a data network. Such a mobile computing device could run appropriate application software to conduct VOIP telephone calls via a wireless data connection. Thus, a mobile computing device, such as an Apple iPhone™, a RIM Blackberry or a comparable device running Google's Android operating system could be a mobile telephony device.

In still other instances, a mobile telephony device may be a device that is not traditionally used as a telephony device, but which includes a wireless data transceiver that can establish a wireless data connection to a data network. Examples of such devices include the Apple iPod Touch™ and the iPad™. Such a device may act as a mobile telephony device once it is configured with appropriate application software.

FIG. 1 illustrates that a mobile computing device with cellular capabilities 136 is capable of establishing a first wireless data connection A with a first wireless access point 140, such as a WIFI or WIMAX router. The first wireless access point 140 is coupled to the Internet 110. Thus, the mobile computing device 136 can establish a VOIP telephone call with the IP telephony system 120 via a path through the Internet 110 and the first wireless access point 140.

FIG. 1 also illustrates that the mobile computing device 136 can establish a second wireless data connection B with a second wireless access point 142 that is also coupled to the Internet 110. Further, the mobile computing device 136 can establish a third wireless data connection C via a data channel provided by a cellular service provider 130 using its cellular telephone capabilities. The mobile computing device 136 could also establish a VOIP telephone call with the IP telephony system 120 via the second wireless connection B or the third wireless connection C.

Although not illustrated in FIG. 1, the mobile computing device 136 may be capable of establishing a wireless data connection to a data network, such as the Internet 110, via alternate means. For example, the mobile computing device 136 might link to some other type of wireless interface using an alternate communication protocol, such as the WIMAX standard.

Figure 2:
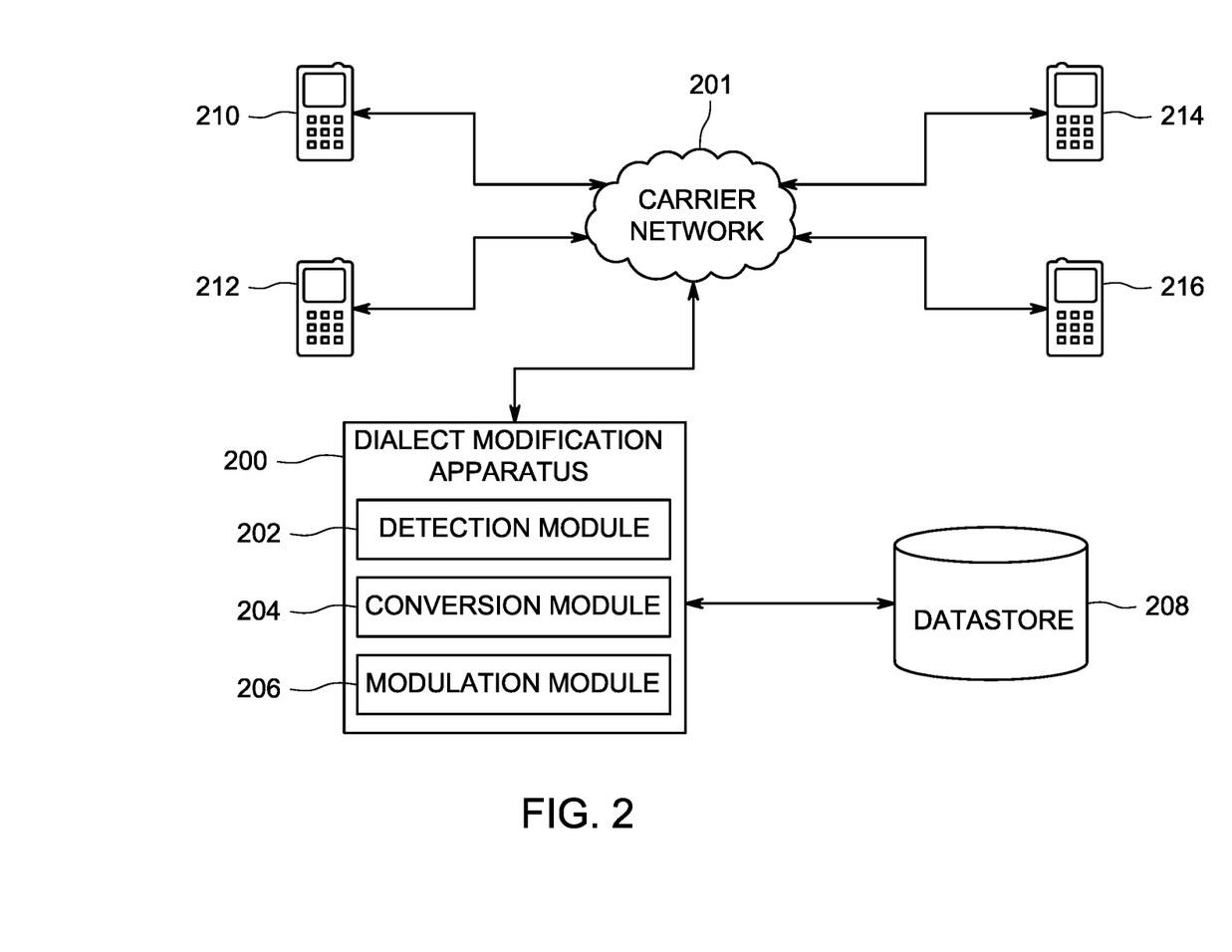
FIG. 2 is a block diagram depicting a dialect modification apparatus in accordance with exemplary embodiments of the present invention.

FIG. 2 is a block diagram depicting a dialect modification apparatus 200 in accordance with exemplary embodiments of the present invention. The apparatus 200 comprises a detection module 202, a conversion module 204 and a modulation module 206. According to an exemplary usage of the dialect modification apparatus 200, a call is initiated by a first participant 210 to a second participant 216. The present invention does not limit the number of participants engaged in a call, however. For example, third participant 212 and fourth participant 214 may also join the established call between participants 210 and 216. The call is initiated over a carrier network 201, where according to some embodiments, the carrier network 201 is a VoIP network and one or more of the client devices participate in the call using a VoIP application installed on their device. According to some embodiments, the dialect modification apparatus 200 may be housed in a media relay of an underlying VoIP system as described in FIG. 1.

Those of ordinary skill in the art will recognize that the network 201 may be any type of network, for example an IP network, or the like. In some embodiments, carrier network 201 may be comprised of one or more of the elements described in FIG. 1, such as, for example, internet 110, IP Telephony System 120, Gateway 122, and/or PSTN provider 130. A mixture of none, some or all of the devices used by participants may be VoIP devices. For example, participant 210 calls second participant 216 via a VoIP application installed on the client device of participant 210, but second participant 216 receives the call via his or her analog telephone device operating on a PSTN or a cellular phone operating on a cellular provider network. However, those of ordinary skill in the art would recognize that the present application does not limit the dialect modification apparatus 200 to only a VoIP network.

According to one embodiment, once the call has begun and participants (for example, participants 210-216) of the conversation have started speaking, the dialect modification apparatus 200 receives a source audio signal associated with each participant. The detection module 202 then detects the dialect of each participant based on one or more of their voices in the call, their caller ID, their user ID if using a VoIP network, and associated metadata. In other words, the detection module 202 detects a source dialect for each participant. In some instances, the metadata may further contain location information for the origination of the call, social media profile information, contact information, destination of the call or the like. Taken together, this data can strongly predict a particular user's dialect.

In some instances, a caller identification number (CLID) can be used to retrieve a caller's location and as a result, the dominant dialect in that area. In addition, if the service provider 201 stores a user address book, then the CLID can be found in a contact which, in turn, may provide more information such as physical address or location of the caller.

Additionally, social media may be used in several ways. For example, a caller dialect may be selected based on the geographical area where the user "checked-in" the most. Also, place of birth, where the caller studied and the like may indicate the dialect of a caller as well. Such information may generally be accessed via specialized APIS for providing user information.

Alternatively, a sample of the participant's voice is taken from the source audio signal by the detection module 202 and compared to existing dialects stored in a datastore 208. The datastore 208 may be a relational database, or other type of data storing service. In some instances, the datastore 208 may be located locally or remotely from the dialect modification apparatus 200. The datastore 208 stores dialects samples, speech profiles and other data related to voice modification during a call. In some embodiments, a speech profile is returned to the detection module 202 based on the dialect matched from the datastore 208.

The dialect modification apparatus 200 determines a target dialect for the call based on a preference of the participant who initiated the call, predominance of particular speech profiles among the participants or the like. The conversion module 204 converts the participants' voices into text based on the participants detected dialects and couples the text to the modulation module 206. For example, if one participant's dialect was American English, the speech-to-text engine would be notified of this dialect so that the text conversion would be performed accurately.

The text is associated with particular speech changes by the modulation module 206. For example, if the target dialect is "British English" and the participant speech being converted is "Australian English", particular words such as "good day" may be associated with a modulation change such as separating the timing between the two words, extending vowel sounds, or the like to conform the speech to the target dialect.

Subsequently, the text with associated modulations is converted into speech by the conversion module 204 to create a modulated audio signal based on the source audio signal, the source dialect and the target dialect using well known text-to-speech conversion engines to conform to the selected target dialect and transmitted to other client devices. Some examples of text-to-speech engines that may be used include NUANCE Loguendo TTS engine, READ-SPEAKER, AT&T research lab conversion, or the like. In some embodiments, the conformed, or modulated, speech is delivered to one or more participants of the voice call, depending on the various gaps between the speech profiles of the participants. For example, if first participant 210 and second participant 212 have the same speech profile, first participant 210 will not hear a modulated version of the voice of second participant 212 and vice versa. On the other hand, if the speech profiles retrieved for participant 214 and participant 212 are different, participant 212 will hear a modulated voice of participant 214 and the participant 214 will hear a modulated voice of participant 212, where the voices are modulated to conform to the target dialect. In some embodiments, each participant may require that incoming voice calls be modulated to the participant's dialect. For example, the first participant 210 may configure it so that their personal dialect is the target dialect for all incoming calls to the first participant 210. Similarly, on the same call, third participant 214 may configure it so that all incoming voice is modulated to the dialect of participant 214.

According to some embodiments, voice modulation is only performed if the difference in dialect exceeds a predetermined accent threshold. For example, for each dialect a set of keywords/phrases are chosen that will serve as the benchmark for those dialects. The difference between the way a speaker pronounces one of the keywords will be measured against the benchmarked pronunciation. In some embodiments, the difference may be measured by amplitude differences, time to pronounce a certain syllable in a word, saying different vowels and the like. The threshold will be reached on a per word basis or, if the speaker was very close to a threshold a certain number of times.

According to other embodiments, text-to-speech conversion is not performed by the conversion module 204. In these embodiments, the audio of each participant is "massaged", or "modulated" to conform to the target dialect directly. Each voice call participants' voice is broken or parsed into phonemes, or small contrastive units of sound in a sound system of a language. Each phoneme is analyzed by the modulation module 206 in light of the target dialect, and the difference between the phoneme of the participant speech and the target dialect is identified. Based on the identified difference, the modulation module 206 modifies the pitch, speed, duration, or other audio qualities of the speech to conform the speech to the target dialect phoneme. In some embodiments, this phoneme conversion is performed in real-time, or with a slight delay based on processing time of the underlying hardware of the dialect modification apparatus 200, preserving the identity of each participant while making each participant easier to understand to others. In some embodiments, participants who would like to hear other participants without voice modulation may disable any voice modulation generated by the dialect modification apparatus 200.

According to one example, if a participant is not engaged in a phone conference, but is placing a call to a call center in a foreign country, the call center technician may have an accent that is difficult to understand for the call initiating participant. In this instance, the dialect of the call center technician is modified by the dialect modification apparatus 200 to the dialect of the call initiating participant. In other instances, the dialect is always modified to the common dialect in the country or state where the dialect modification apparatus 200 is provided. In some embodiments, the modulated voice is analyzed by the dialect modification apparatus 200 to determine whether modulation was successful, and if not, documenting the deficiencies for future voice modulations. The determination of the success of modulation may be decided based on participant feedback, or based on an analysis of the modulated voice with respect to the target dialect.

Figure 3:
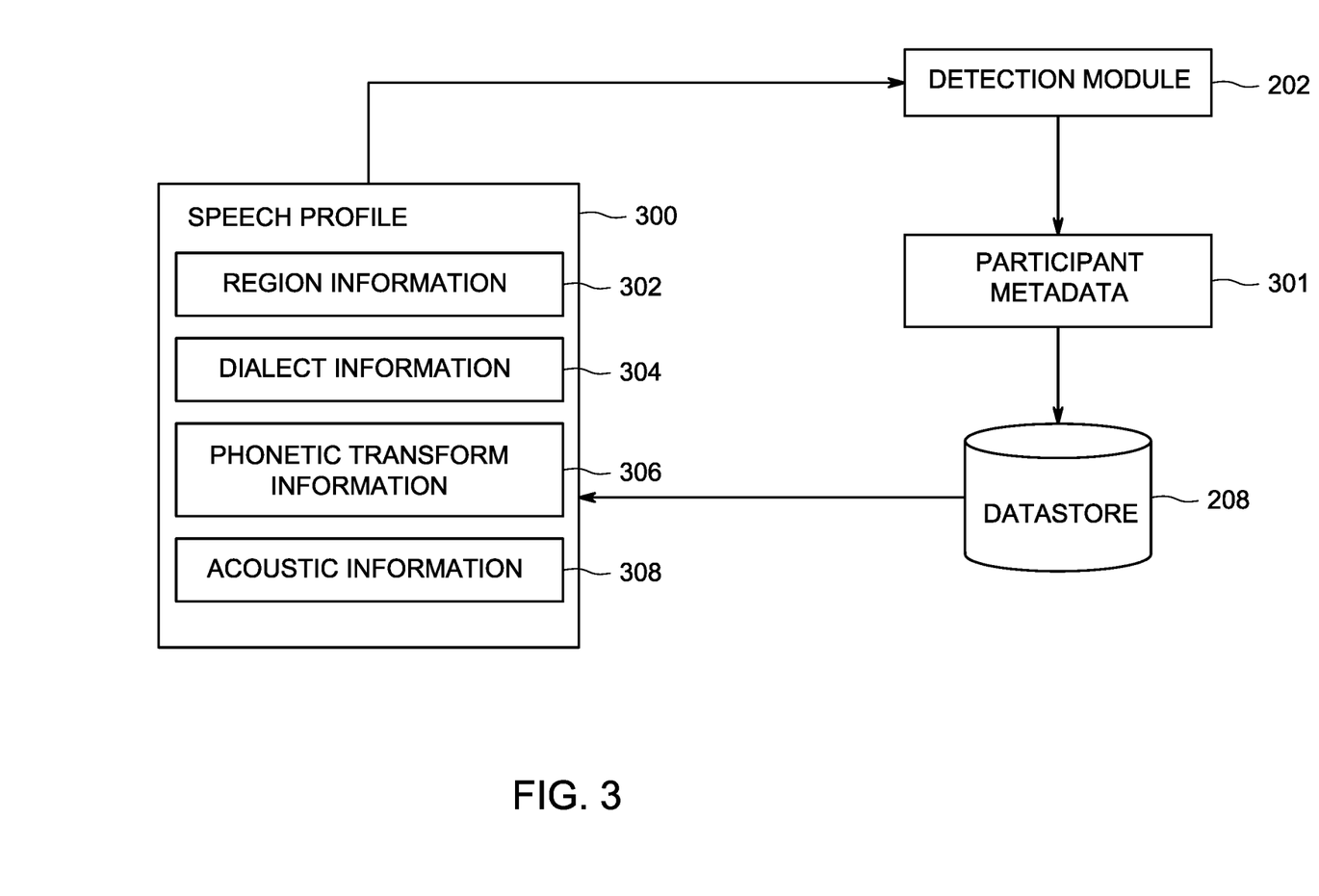
FIG. 3 is a block diagram detailing the operation of a detection module in accordance with exemplary embodiments of the present invention.

FIG. 3 is a block diagram detailing the operation of the detection module 202 in accordance with exemplary embodiments of the present invention. As described above, the detection module 202 parses the voice content of all participants and retrieves an associate's speech profile associated with each participant. According to FIG. 3, the detection module 202 retrieves a speech profile 300 from the datastore 208 based on the detected user dialect. In some embodiments, the selection of a speech profile is greatly enhanced by participant metadata 301 to increase the accuracy of the selected speech profile.

In some embodiments, the participant metadata 301 may include information stored with respect to a user profile associated with a unique identifier (e.g., caller ID, messaging system identifier, email address, account identifier, IP address, name, and the like) of the user. The user profile may be maintained in a database by the service provider. For example, according to exemplary embodiments, the participant metadata may include such information as the telephone number of the participant, a caller ID of the participant, the city, state and country of the participant, a voice sample, social media information, contacts and the like. In some embodiments, the participant metadata 301 retrieved from a user profile stored in a database maintained by the service provider may include previous dialect information detected or used on a previous history of call(s). In some embodiments, the participant metadata 301 retrieved from a user profile stored in a database maintained by the service provider may include a user selection of a first dialect they would like to voice to be modulated to (i.e., how a user would like to sound to other participants), and/or a user selection of a second dialect that they would like the other participant(s) voice to be modulated to (how a user would like other participants to sound to them). In some embodiments, an identifier of one or more of the participants may be used to lookup participant metadata 301 in a user database to determine dialects used in previous calls by the user. Those of ordinary skill in the art will recognize that the participant metadata 301 may include any information available from a service provider which aids in identifying the user's region or dialect information as described above.

The speech profile 300 is comprised of regional information 302, dialect information 304, phonetic transformation information 306 and acoustic information 308. The regional information 302 contains information about the specific region a participant is calling from or is associated with, for example, the city, state, country, or the like. The dialect information 304 contains data identifying a speaking dialect for the participant. The dialect information 304 may be a pointer to a database record of particular nuances of the dialect.

For instance, the database record may contain a dialect record for the Southern United States dialect. The record for the dialect may indicate pronunciation of particular words, or the phonetics of a particular letter when speaking that dialect. The phonetic transformation information 306 contains data on how to transform the dialect contained in the dialect information 304 to the target dialect selected by the dialect modification apparatus 200. Finally, the speech profile 300 further contains acoustic information 308, where the acoustic information 308 dictates the acoustic differences encountered in this particular speech profile from various other speech profiles.

According to some embodiments, the phonetic transformation information 306 and the acoustic information 308 is described in the paper entitled "Characterizing phonetic transformations and fine-grained acoustic differences across dialects" by Nancy Fang-Yih Chen, published at http://mit.dspace.org/handle/1721.1/65514, hereby incorporated by reference in its entirety. Further information on phonetic transformation and acoustic differences can be found in the paper entitled "Methods for Characterizing Participants' Nonmainstream Dialect Use in Child Language Research", also hereby incorporated by reference in its entirety. Both of the methods described in these two papers may be used to compile phonetic transformation information and acoustic information in the present application. The speech profile 300 is retrieved from the datastore 208 by the detection module 202, and used for further operation.

Figure 4:
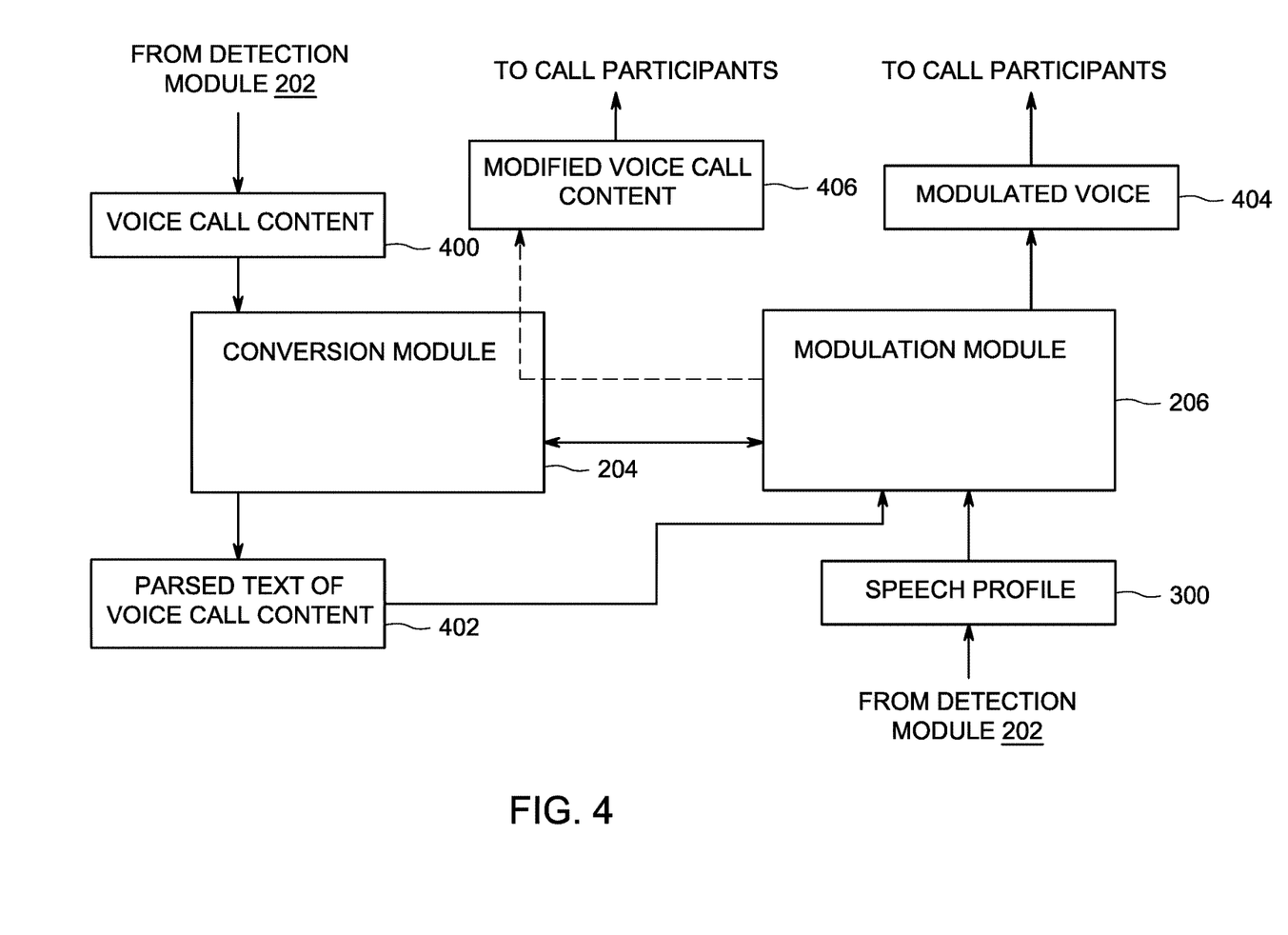
FIG. 4 is a block diagram detailing the interaction of a conversion module and a modulation module in accordance with exemplary embodiments of the present invention.

FIG. 4 is a flow diagram detailing the interaction of the conversion module 204 and the modulation module 206 in accordance with exemplary embodiments of the present invention.

Voice call content 400 is passed to the conversion module 204 from the detection module 202. According to one embodiment of the present invention, the conversion module 204 converts the voice call content to parsed text 402 using well known speech-to-text engines such as DRAGON Naturally Speaking, LumenVox or the like. The parsed text 402 is then coupled to the modulation module 206 along with the selected speech profile 300 retrieved from the datastore 208 by the detection module 202.

According to one embodiment, the modulation module 206 determines, based on the speech profile 300, what changes need to be made to the parsed text 402, and associated particular changes with portions of the text 402. The text and the associated changes are passed to the conversion module 204, and the conversion module 204 converts the text back to speech in the form of the modified voice call content 406, based on the changes indicated by the modulation module 206. The modified voice call content 406 is then transmitted to the appropriate call participants, as determined by the speech profile of each participant.

According to another embodiment, the conversion module 204 passes the voice call content 400 directly to the modulation module 206 without performing speech-to-text conversion. The modulation module 206 then parses the voice call content 400 into various phonemes. The difference between the phonemes of the participant and the phonemes of the target dialect are determined, and based on the speech profile 300, the modulation module 206 modulates portions of the voice call content 400 to generate a modulated voice 404. The modulated voice 404 is modulated according to the predetermined or chosen one or more target dialects. The modulated voice 404 is then relayed to the appropriate call participants, based on which dialect the recipients are programmed to hear.

In some embodiments, calls be routed based on a detected dialect of a caller. For example, the caller's dialect would be determined, or retrieved if previously stored in association with an identifier of the caller. Once the caller's dialect has been determined, or retrieved, the call would be routed to a customer service or sales agent, for example, that has a matching dialect. In some embodiments, the call may be routed to any customer service or sales agent, for example, but the agent's voice would be modulated accordingly. In some embodiments, the agent's voice would be modulated to a target dialect based on a preference of the caller, or based on a customer satisfaction ratings or sales revenue generation data associated with particular dialects.

Figure 5:
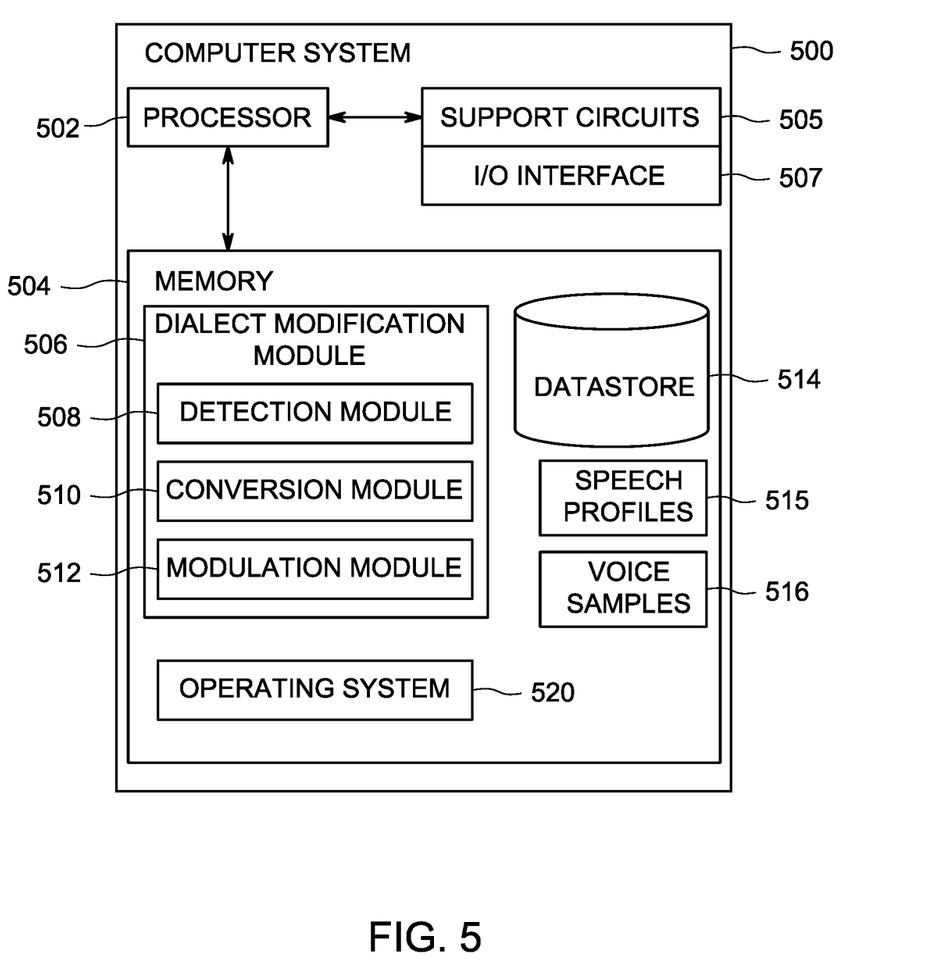
FIG. 5 is a block diagram depicting a computer system for implementing the dialect modification apparatus in accordance with exemplary embodiments of the present invention.

FIG. 5 is a block diagram depicting a computer system for implementing the dialect modification apparatus 200 in accordance with exemplary embodiments of the present invention. The computer system 500 includes a processor 502, various support circuits 505, and memory 504. The processors 502 may include one or more microprocessors known in the art. The support circuits 505 for the processor 502 include conventional cache, power supplies, clock circuits, data registers, I/O interface 507, and the like. The I/O interface 507 may be directly coupled to the memory 504 or coupled through the support circuits 505. The I/O interface 507 may also be configured for communication with input devices and/or output devices such as network devices, various storage devices, mouse, keyboard, display, video and audio sensors and the like.

The memory 504, or computer readable medium, stores non-transient processor-executable instructions and/or data that may be executed by and/or used by the processor 502. These processor-executable instructions may comprise firmware, software, and the like, or some combination thereof. Modules having processor-executable instructions that are stored in the memory 504 comprise an dialect modification module 506 and a datastore 514. The dialect modification module 506 further comprises a detection module 508, a conversion module 510 and a modulation module 512. Speech profiles 515 and voice samples 516 of the various participants in a voice call may also be stored in memory 504. In other instances, the speech profiles and voice samples are stored in a cloud storage for access and retrieval.

The computer system 500 may be programmed with one or more operating systems 520, which may include OS/2, Linux, SOLARIS, UNIX, HPUX, AIX, WINDOWS, IOS, and ANDROID among other known platforms.

The memory 504 may include one or more of the following: random access memory, read only memory, magneto-resistive read/write memory, optical read/write memory, cache memory, magnetic read/write memory, and the like, as well as signal-bearing media as described below.

Those skilled in the art will appreciate that computer system 500 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

Figure 6:
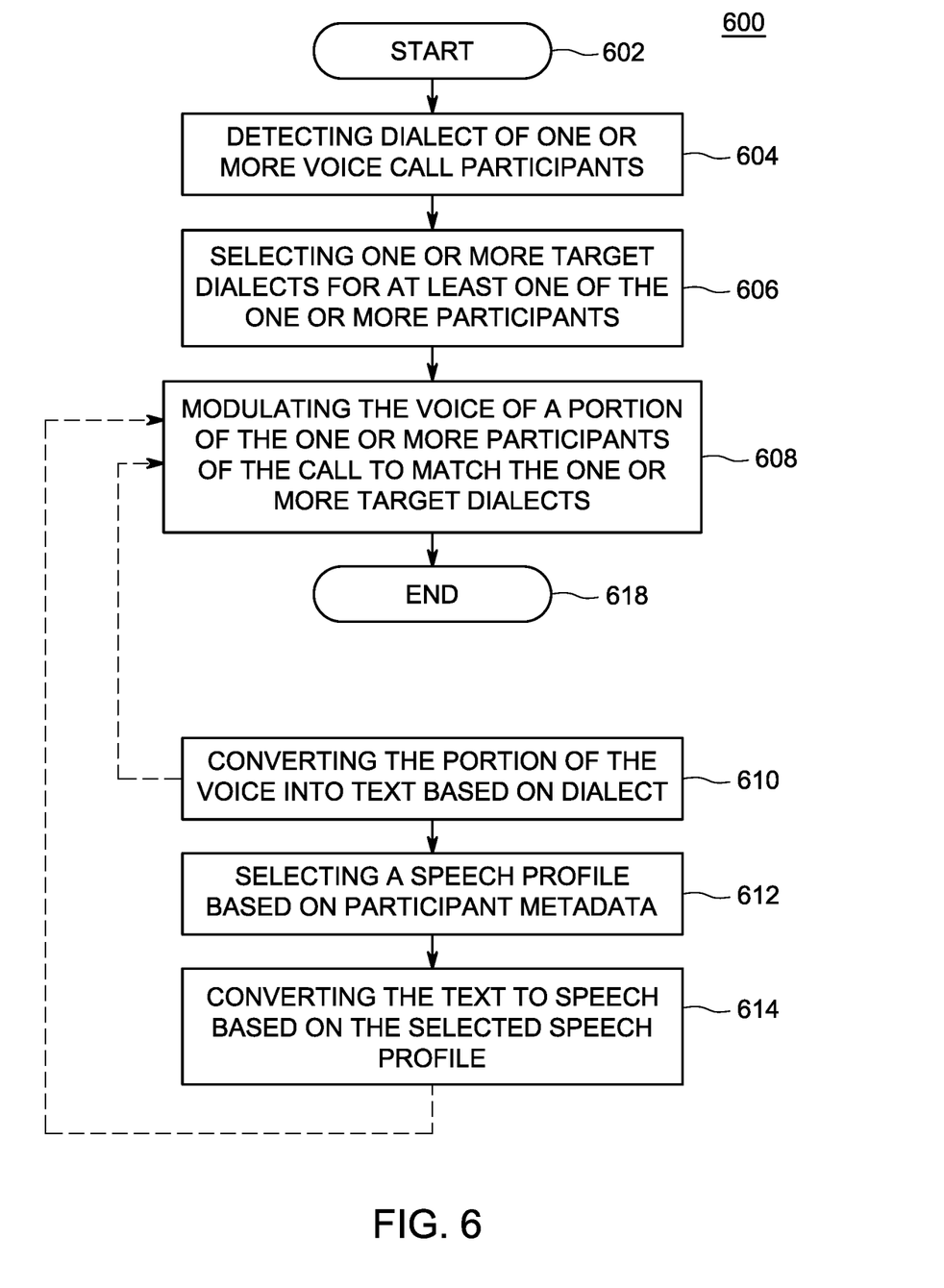
FIG. 6 is a flow diagram for a method for call modification in accordance with exemplary embodiments of the present invention.

FIG. 6 is a flow diagram for a method 600 for call modification in accordance with exemplary embodiments of the present invention. The method 600 is an exemplary process flow of the dialect modification apparatus 200, implemented as the dialect modification module 506, executed on the computer system 500.

The method begins at step 602 and proceeds to step 604. At step 604, the detection module 508 detects the dialect of one or more voice call participants. The detected dialects may be all the same, or each one may differ. The goal is to align the dialects so that all participants may understand each other. The dialects are detected based on a received source audio signal associated with at least one participant. The source audio signal comprises a voice of the at least one participant.

At step 606, one or more target dialects are chosen for at least one of the one or more participants. Namely, it is not necessary that only one target dialect be selected for all participants. The dialect modification module 506 can be configured to enable each participant to hear other participants' speech in their dialect. Alternatively, participants in the same region can be configured to have other participants voice modulated to the dialect of the participants in the same region, and/or vice versa. In other embodiments, the target dialect is selected based on at least a characteristic of a target participant. For example, if a target participant is from a particular region in China, the target dialect is selected as the dialect prevalent in that region of China.

The method then proceeds to step 608, where the modulation module 512 modulates the voice of a portion of the one or more participants of the call to match the one or more target dialects. The modulation module 512 modulates an audio signal based on the source audio signal, the source dialect and the target dialect. Step 608 may also comprise sub-steps 610-614. At step 610, the portion of the voice which is to be modulated is converted into text based on the detected dialect of each participant. Subsequently, a speech profile is selected based on participant metadata at step 612. The text of the portion of speech that is to be modulated is associated with modifications depending on the selected speech profile to match the one or more target dialects. At step 614, the method 600 converts the text back to speech based on the selected speech profile and the associated modifications, in the one or more target dialects. The modulated audio signal is then transmitted to the target recipient. The method 600 returns to step 608 and the method terminates at step 618.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method for voice modification during a call comprising:
retrieving participant metadata for a first participant of the call, wherein the participant metadata includes information regarding a target dialect used in previous calls associated with the first participant;
creating a modulated audio signal based on a source audio signal of a second participant and the target dialect;
analyzing the modulated audio signal of the second participant to determine whether the modulation was successful;
adjusting the modulation when the modulation is not successful; and
transmitting the modulated audio signal to the first participant.

2. The method of claim 1, wherein the participant metadata is stored in a user profile associated with the first participant.

3. The method of claim 2, wherein a unique identifier of the first participant is used as a lookup key to locate the user profile associated with the first participant.

4. The method of claim 3, wherein the unique identifier of the first participant is one of a caller ID, messaging system identifier, email address, account identifier, or IP address of the first participant.

5. The method of claim 1, wherein creating a modulated audio signal comprises:
converting the audio signal associated with the second participant to a source text;
selecting a speech profile based on metadata associated with the first participant;

transforming the source text into modified text based on the speech profile; and converting the modified text to speech, based on the selected speech profile.

6. A method for voice modification during a call, comprising:

retrieving participant metadata for a first participant of the call, wherein the participant metadata includes information regarding a target dialect used in previous calls associated with the first participant;

creating a modulated audio signal based on a source audio signal of a second participant and the target dialect;

transmitting the modulated audio signal to the first participant; and determining whether the modulation was successful based on feedback from the at least one the first or second participant.

7. A method for voice modification during a call comprising:

retrieving participant metadata for a first participant of the call, wherein the participant metadata includes at least one of (A) a first target dialect selected by the first participant to be applied to a source audio signal of the first participant or (B) a second target dialect selected by the first participant to be applied to source audio signals of other participants of the call;

creating a modulated audio signal based on at least one of the first target dialect and the source audio signal of the first participant, or the second target dialect and the source audio signal of the other participants of the call;

analyzing the modulated audio signal to determine whether the modulation was successful;

adjusting the modulation when the modulation is not successful; and transmitting the modulated audio signal to the participants of the call.

8. The method of claim 7, wherein the participant metadata is stored in a user profile associated with the first participant.

9. The method of claim 8, wherein a unique identifier of the first participant is used as a lookup key to locate the user profile associated with the first participant.

10. The method of claim 9, wherein the unique identifier of the first participant one of a caller ID, messaging system identifier, email address, account identifier, or IP address of the first participant.

11. The method of claim 7, further comprising:

further determining whether the modulation was successful based on feedback from at least one of the participants.

12. A method for routing a call, comprising:

determining a dialect of a first participant of the call, wherein the dialect of the first participant is one of retrieved from participant metadata associated with the first participant, or detected via a dialect detection analysis of an audio signal associated with the first participant;

routing the call to a second participant of the call based on the determined dialect of the first participant;

creating a modulated audio signal based on a source audio signal of the second participant and the determined dialect of the first participant;

analyzing the modulated audio signal to determine whether the modulation was successful;

adjusting the modulation when the modulation is not successful; and transmitting the modulated audio signal to the first participant.

13. The method of claim 12, further comprising:

further determining whether the modulation was successful based on feedback from at least one of the participants.

* * * * *